United States Patent [19]

McGaughey

[11] 4,322,914
[45] Apr. 6, 1982

[54] SLIDEABLE CLOSURE CONSTRUCTION

[75] Inventor: Donald C. McGaughey, Bristol, Ind.

[73] Assignee: State Wide Aluminum of Indiana, Inc., Elkhart, Ind.

[21] Appl. No.: 96,192

[22] Filed: Nov. 20, 1979

[51] Int. Cl.³ .................. E06B 3/42; E05D 13/04; E06B 7/16

[52] U.S. Cl. ...................................... 49/370; 49/449; 49/483; 292/DIG. 38; 292/DIG. 46; 292/19

[58] Field of Search ............... 49/366, 370, 449, 483, 49/404, 120; 292/DIG. 46, 19, DIG. 38

[56] References Cited

U.S. PATENT DOCUMENTS

| | | | |
|---|---|---|---|
| 2,899,256 | 8/1959 | Kelley | 49/483 X |
| 2,964,344 | 12/1960 | Rich | 292/DIG. 46 |
| 3,321,234 | 5/1967 | Harrell et al. | 49/370 X |
| 3,466,075 | 9/1969 | Fernandez et al. | 292/19 |
| 4,158,272 | 6/1979 | Riegelman | 49/404 X |
| 4,202,136 | 5/1980 | Riegelman | 49/370 X |

Primary Examiner—Philip C. Kannan
Attorney, Agent, or Firm—Price, Heneveld, Huizenga & Cooper

[57] ABSTRACT

A slideable closure construction comprises a frame having a track with a pair of closures slideably mounted therein. The closures include interior end edges which abut in a closed position, and are spaced apart in an open position. A male latch member extends continuously along the length of the end edge of one closure, and a female latch member extends continuously along the end edge of the other closure. The male and female latch members form a snap lock which securely interconnects the two closures in the closed position, and simultaneously forms a weatherproof seal therebetween.

13 Claims, 9 Drawing Figures

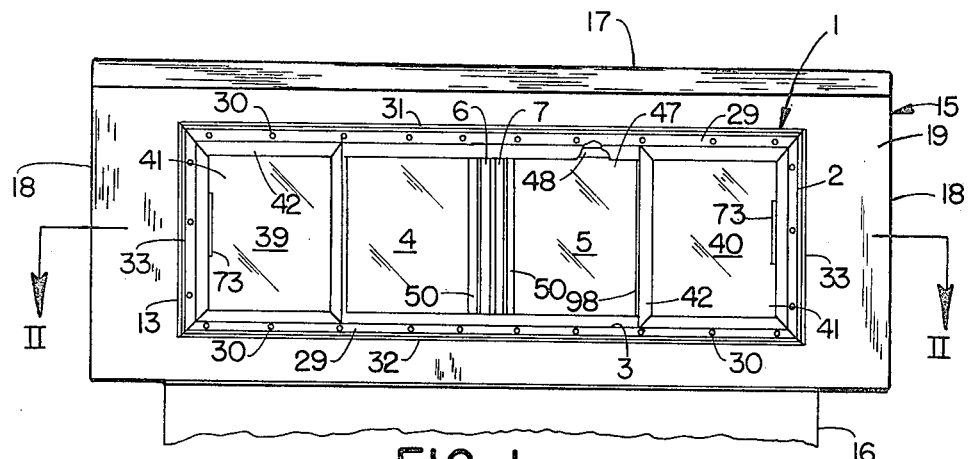
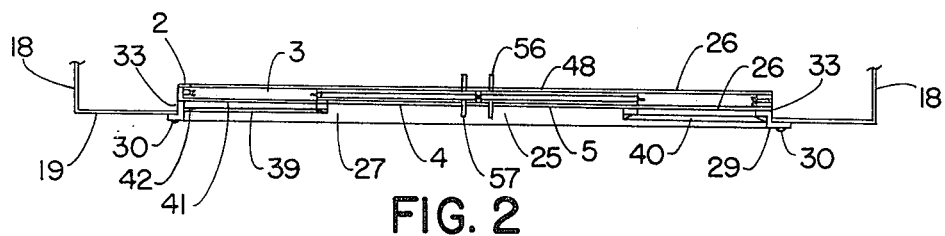
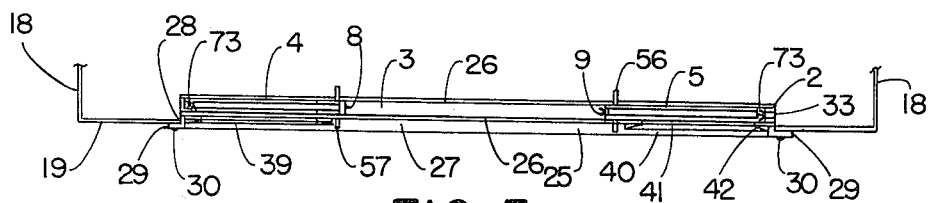
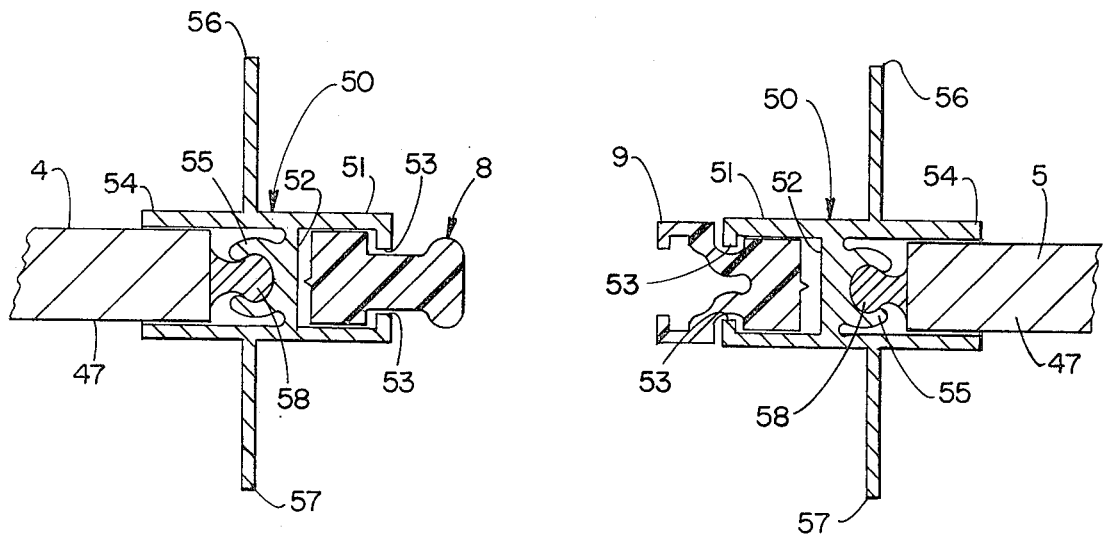
FIG. 1
FIG. 2
FIG. 3
FIG. 4
FIG. 5

SLIDEABLE CLOSURE CONSTRUCTION

BACKGROUND OF THE INVENTION

This invention relates to sliding closure constructions, and in particular to a latch and seal arrangement therefor.

Slidable closure structures, such as doors, screens, windows, and the like, are used in a wide variety of applications. Slideable closure structures for exterior openings typically require both a latch mechanism to lock the closure in the closed position, as well as a seal to form a weathertight joint.

One application of exterior slideable closure structures comprises front windows for vehicle covers or "caps", such as those used with pickup trucks, and other recreational vehicles. Such units preferably provide easy access to the rear or bed of the truck, and include a secure weathertight seal to keep air, rain, dirt, exhaust gases, and the like, from entering the cap. Heretofore, slideable closure units for pickup truck caps have included a flexible seal positioned between the interior end edges of the sliding window members, as well as a separate latch, such as an over-center clasp mechanism, to lock the window members closed. For a variety of reasons, such seals have been found to be ineffective, and tend to deteriorate quickly. Further, the latch portion of these devices are difficult to operate, particularly with a single hand, as is preferred when the closures are used with pickup caps. When the closures of such devices are in the open position, they tend to vibrate and slide back and forth as the vehicle is driven over the road.

SUMMARY OF THE INVENTION

The principal objects of the present invention are: to provide a slideable closure construction having mating male and female latch members which securely interconnect the closures and simultaneously form a weatherproof seal therebetween; to provide such a construction which is easily opened and positively locked with one hand; to provide such a construction which can be manipulated from either side of the closure; to provide such a construction having a second latch arrangement for positively retaining the closures in a fully opened position, and alleviating vibration of the closures in the frame; to provide such a construction which locks without jamming; to provide such a construction which is particularly adapted for use in windows for vehicle caps; and to provide such a construction which is economical to manufacture, efficient in use, capable of a long operating life, and particularly well adapted for the proposed use.

These and many other important advantages of the invention will be further understood and appreciated by those skilled in the art by reference to the following written specification, claims and appended drawings.

BRIEF DESCRIPTION OF THE DRAWINGS

FIG. 1 is a front elevational view of a slideable closure construction embodying the present invention, wherein the closure construction is shown mounted in a pickup cap.

FIG. 2 is a horizontal cross-sectional view of the closure construction taken along the line II—II, FIG. 1, with the closures shown in a closed position.

FIG. 3 is a horizontal cross-sectional view of the closure construction taken along line II—II, FIG. 1, with the closures shown in a fully opened position.

FIG. 4 is a fragmentary, enlarged, horizontal cross-sectional view of the closure construction, particularly showing a male latch member connected with an interior end edge of one of the closures.

FIG. 5 is a fragmentary, enlarged, horizontal cross-sectional view of the closure construction, particularly showing a female latch member connected with the interior end edge of the other closure.

DETAILED DESCRIPTION OF THE PREFERRED EMBODIMENTS

Figure 6:
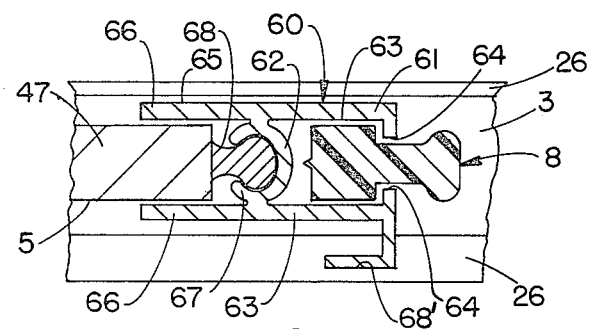
FIG. 6 is a fragmentary, enlarged, horizontal cross-sectional view of the closure structure, particularly showing a male latch member connected with an exterior end edge of a closure.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates a slideable closure construction embodying the present invention, and comprises a frame 2 having a track 3 with a pair of closures 4 and 5 mounted therein. The closures 4 and 5 include interior end edges 6 and 7 which abut in a closed position (FIG. 2), and are spaced apart in an open position (FIG. 3). A male latch member 8 (FIG. 4) extends continuously along the length of one of the closures, and a female latch member 9 (FIG. 5) extends continuously along the end edge of the other closure. The male and female latch members 8 and 9 form a snap lock which securely interconnects the two closures 4 and 5 in the closed position, and simultaneously forms a watertight and weatherproof seal therebetween.

The illustrated slideable closure construction 1 is particularly adapted for use in conjunction with a closure or cap 15 (FIG. 1) for vehicles, such as a pickup truck, recreational vehicle, or the like. In this example, the vehicle cap 15 includes a base 16 shaped for placement in the bed of a pickup truck, a roof 17, side panels 18, and a front panel 19. The cap front panel 19 has an aperture therein in which the slideable closure construction 1 is mounted. When the cap is connected with a pickup truck (not shown), the closure construction 1 is disposed directly behind the rear window of the truck cap or along the sides thereof.

The frame 2 slideably mounts the closures 4 and 5 therein, and in the illustrated structure, comprises a substantially rectangularly-shaped member oriented across the width of the cap front panel 19. As best illustrated in FIGS. 2 and 3, the frame 2 is constructed of a channel member 25 having a pair of radially inwardly extending flanges 26 which form the U-shaped track 3 therebetween. The track 3 is disposed on the interior side of the frame 2, and a ledge 27 is provided on the forward side of the closure construction. The frame 2 extends through a mating aperture 28 formed in the front panel 19 of the vehicle cap 15, and includes a front flange 29 which extends around the marginal edge of the frame, and protrudes outwardly thereof in a perpendicular relationship with the ledge 27. A plurality of fasteners 30 are spaced regularly along the flange 29, and securely connect the closure construction 1 with the vehicle cap 15. The channel 25, ledge 27, and flange 29 are preferably integrally formed, in the nature of an extruded aluminum channel, and four segments of the channel are used to form the bottom 31, top 32, and sides 33 of the frame, and are rigidly interconnected by suitable fasteners (not shown).

A pair of fixed closures 39 and 40 are positioned in the frame 2 on the ledge 27 thereof at the extreme left and right-hand ends of the frame. The closures 39 and 40 are fixedly connected in the frame 2, and in the illustrated example, include a panel of transparent material 41, such as glass, or plastic, with weather stripping 42 positioned about the exterior marginal edge of each of the panels 41 to securely mount the panels in the frame. It is to be understood that the closures 4, 5, 39 and 40 may comprise screens, opaque closures, translucent panels, or the like, and that the term "closure" as used herein, contemplates and encompasses each of these designs, as well as other related structures.

The sliding closures 4 and 5 are mounted in the frame track 3 in a manner whereby the interior end edges 6 and 7 of the same abut in a closed position, as illustrated in FIG. 2, and are spaced apart in the open position, as illustrated in FIG. 3. In this example, each of the sliding closures 4 and 5 includes a transparent panel 47, such as glass, plastic, or the like, with a frame 48 extending about the marginal edge thereof. The frame 48 comprises C-shaped channel members disposed at the top and bottom of the glass panel 47, having a pair of parallel flanges between which the marginal edge of the glass panel 47 is received and retained. The C-shaped channel members have a lateral, outside width which is slightly less than the width of the track 3, whereby the same freely slides therein.

Each of the frames 48 also includes an interior side member 50, which as best illustrated in FIGS. 4 and 5, includes a C-shaped inner channel 51 which is shaped to retain one of the latch members 8 and 9 therein, and has a back face 52, and in-turned free ends 53. The interior side member 50 includes a C-shaped outer channel 54 which is proportioned to receive the side edge of a glass panel 47 therebetween, and includes an arcuately-shaped seal mounting groove 55 within which a segment of resilient, flexible weather stripping 58 is mounted and forms a weathertight seal between the window and the frame. The interior side member 50 also includes a pair of flanges 56 and 57 which extend continuously along the length of the side member, and protrude outwardly from both the interior and exterior sides of the frame side member at an angle substantially perpendicular to the glass panel 47 at a medial portion of the frame member. The interior member 50 of the frame 2 is preferably integrally formed in one piece, in the nature of extruded aluminum, or the like. Both of the sliding closures 4 and 5 include such a frame side member 50 extending along the entire interior end edge thereof. When the closures 4 and 5 are in the closed position, each pair of flanges 56 and 57 are preferably spaced apart a distance in the range of $\frac{7}{8}-1\frac{1}{8}$ inches, such that the fingers of an average-sized user can be positioned therebetween.

As best illustrated in FIG. 6, the frame 48 for the sliding closures 4 and 5 also includes an exterior side member 60 which extends continuously along the exterior side edge of the glass panel 47. The exterior side member 60 includes an inner C-shaped channel 61 in which one of the latch members 8 and 9 is positioned, and includes an arcuately-shaped back wall 62, a pair of side walls 63, and inwardly turned ends 64 at the open side of the channel. An outer C-shaped channel 65 is formed at the opposite end of the exterior side member 60, and includes a pair of flanges 66 between which the exterior end edge of the glass panel 47 is positioned and retained. A seal mounting member 67 is positioned between the flanges 66, and includes a segment of resilient, flexible weather stripping 68 mounted therein to form a weathertight seal between the window and the frame. An L-shaped leg 68' is connected adjacent to the forward end 64 of the side member, and extends therefrom toward the exterior side of the closure. The leg 68' mates with an oppositely oriented, similar, L-shaped member disposed on the rear side of the fixed closures 39 and 40 along the inner side edge thereof, when the closures are in the fully closed position. The exterior side members 60 are also preferably integrally formed of a one-piece construction, in the nature of extruded aluminum, or the like.

Figure 7:
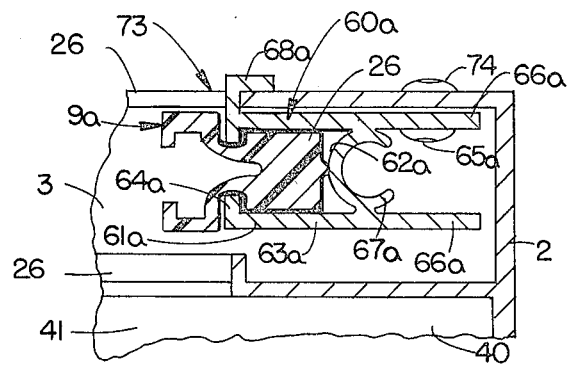
FIG. 7 is a fragmentary, enlarged, horizontal cross-sectional view of the closure construction, particularly showing a female latch member connected with a side member of the frame.

As best illustrated in FIG. 1, a second latch member 73 is connected with the frame 2 at both side edges thereof, and cooperates with the exterior side edges 60 of the sliding closures 4 and 5 to form a snap lock therebetween which positively retains the closures in a fully open position. The latch member 73 includes a segment of channel 60a (FIG. 7) mounted at a medial portion of the frame side edge, and as best illustrated in FIG. 7, the channel is substantially identical in shape with the exterior side member 60. Hence, to facilitate description herein, similar parts and portions of the latch member 73 are represented by the same, corresponding reference numerals used for the exterior side member 60, except for the suffix "a" in the numerals of the former. The window mounting flanges 65a and 66a are not used in this application of the channel, and the leg 68a is positioned over the inside flange 26 of the channel 25. The flange 65a of the channel segment 60a is fixedly attached to the frame 2 by suitable fasteners 74, such as pop rivets, threaded screws, or the like. In the second latch arrangement illustrated in FIGS. 1 and 7, both female latch members are in the nature of $2\frac{1}{2}$ inches long, positioned at a midportion of the associated side frame member 33, and are fixedly connected in the channel member 60a. The male latch members 8 are loosely mounted in the channel member 60, such that the same floats therein for a non-jamming snap connection with the female latch member 9. The male and female latch members 8 and 9 which form the second latches 73 are preferably sized for a snug frictional engagement therebetween to alleviate or dampen vibration of the closures 4 and 5 in the frame 2 as the vehicle is driven over the road, and thereby eliminate and/or attenuate the associated rattling sounds.

Figure 8:
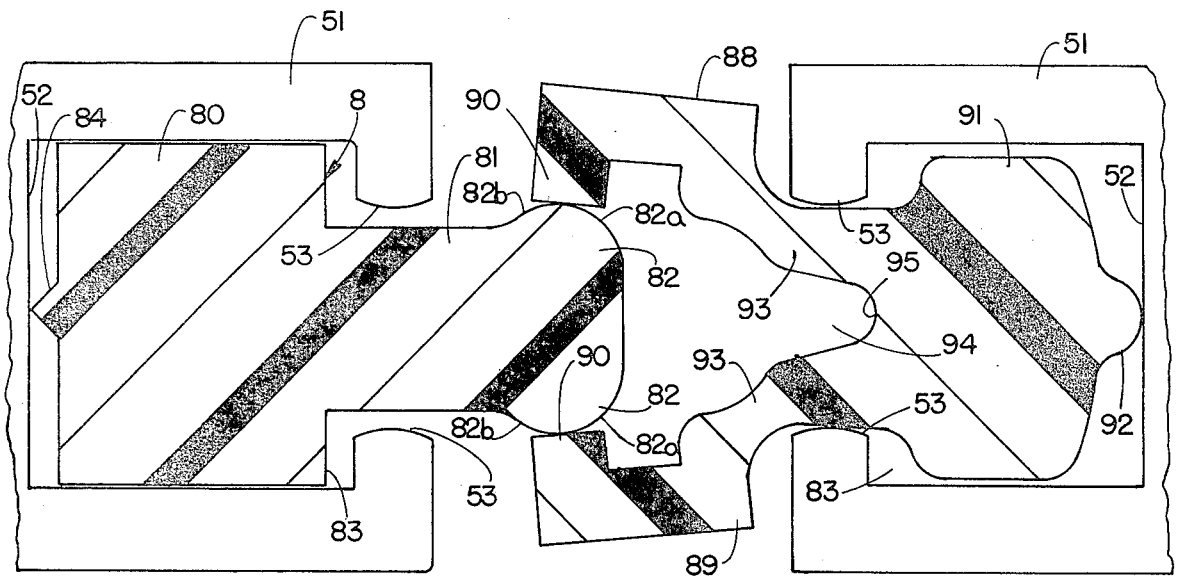
FIG. 8 is a fragmentary, further enlarged, cross-sectional view of the male and female latch members, shown in a partially engaged position.
Figure 9:
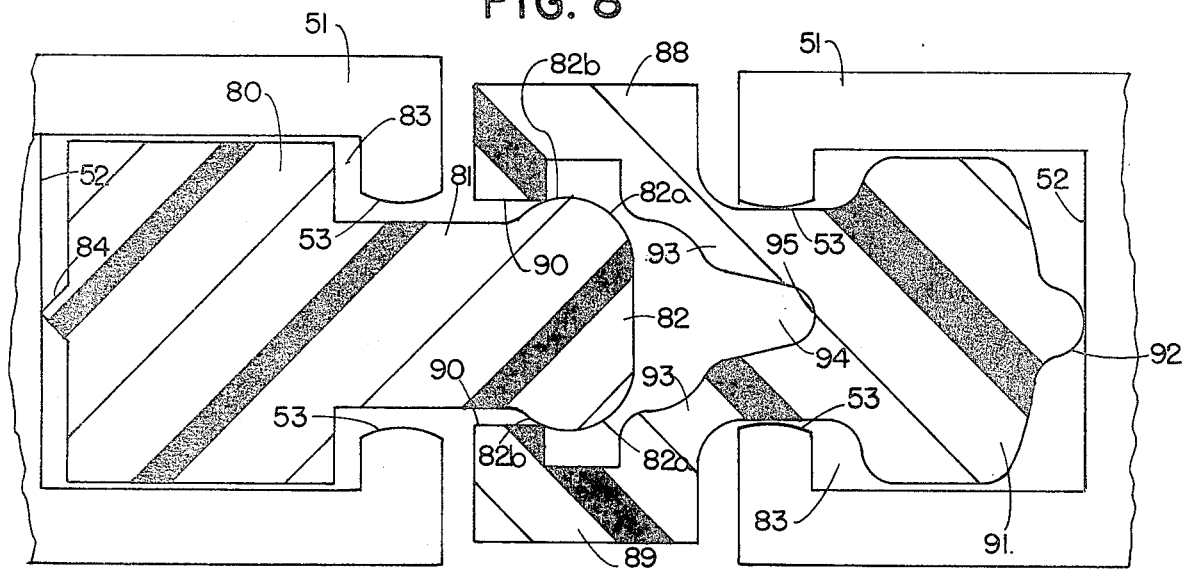
FIG. 9 is a fragmentary, further enlarged, cross-sectional view of the male and female latch members, shown in a fully engaged position.

The male latch member 8 is mounted in one of the interior side members 50, and extends continuously therealong, and is also positioned in either the exterior channel members 60 or the latch members 73. In the illustrated structure, the male latch member 8 is positioned along the interior edge of the left-hand closure 4, as well as on the exterior channel member 60 of each of the closures 4 and 5. As best illustrated in FIGS. 8 and 9, the male latch member 8 includes a substantially rectangularly-shaped base 80 which is captured in the channel 51. A plug portion 81 of the male latch extends outwardly between the free ends 53 of the channel 51, and includes a bulbous-shaped terminal portion 82 which has rounded leading and trailing surfaces 82a and 82b respectively, and is adapted to engage the female latch member 9 in a snap or interference fit. The width and thickness of the base 80 is somewhat smaller than the width and depth respectively of the channel 51, such that an aperture or gap 83 is formed between the two parts, thereby permitting the male latch member 8 to float in the channel 51 for purposes to be described in greater detail hereinafter. A small V-shaped protrusion or bead 84 extends along the rearward face of the male latch member 8, and selectively abuts the rear wall 52 of the channel.

In the illustrated embodiment, the female latch member 9 is disposed along the interior edge of the right-hand sliding closure 5, and is also positioned in each of the latch members 73 at both ends of the frame 2. The female latch member 9 comprises a channel including a pair of flanges 88 and 89 (FIGS. 8 and 9), which are spaced apart a distance adapted to receive the plug portion 81 of the male latch member 8 therebetween in a snap lock or interference fit. The flanges 88 and 89 include inwardly turned, oppositely facing free ends 90 with an arcuately formed surface, between which the plug end 82 is inserted. The female latch member 9 also includes a base member 91 which is loosely captured in the channel member 51 in a manner similar to the previously described mounting of the male base portion 80. The female base 91 also includes a rearwardly extending, arcuately-shaped protuberance 92 extending along the rear face thereof which selectively abuts the back panel 52 of the channel. A pair of arm members 93 interconnect the base and flange portions of the female latch member, and extend between the free ends 53 of the channel. The arms 93 are so shaped so as to form an arcuate cavity 94 therebetween, having the bottom 95 thereof disposed slightly inwardly of the interior of the channel 51, whereby the flanges 88 and 89 resiliently diverge upon abutment with the male latch plug 81, and automatically converge to a normally closed position, as shown in FIG. 9. Both the male and female latch members 8 and 9 respectively, preferably have a substantially uniform lateral cross-sectional shape, and are constructed of a rigid vinyl material, such as a black polyvinylchloride or that marketed under the trade designation B. F. Goodrich PVC 8700A. With this material, the flange free ends 53 are preferably spaced apart a distance in the nature of 0.005 inches less than the width of the largest portion of the male plug end 82.

In use, the closure construction 1 is preferably installed in the front panel 19 of the vehicle cap 15. The entire closure construction 1 is positioned in an opening or aperture 28 through the front panel 19 of the vehicle cap, and is securely connected thereto by fasteners 30. The sliding panels 4 and 5 may be easily sealed closed by simply converging the panels 4 and 5 until the latch members 8 and 9 on the interior side edges thereof abut. Continued convergence of the panels 4 and 5 causes the rounded leading surfaces 82a of the male plug portion 81 to abut and resiliently diverge the free ends 90 of the female flanges 88 and 89. After the bulbous portion 82 of the plug 81 has passed the inside corner of the end edges 53, the female flanges 88 automatically and resiliently return to their normally parallel relationship, thereby locking the bulbous portion of the plug in the channel, as illustrated in FIG. 9. The relief provided by the cavity 94 allows the arms 93 to flex, thereby permitting the converging and diverging action of the flange free ends 90. Preferably, the user applies force to the closures 4 and 5 to close the same by grasping an adjacent pair of flanges 57 or 58, depending upon which side of the closure construction the user is positioned, and pinching the same between his thumb and forefinger, thereby snapping the male and female latch members together. This snap lock arrangement not only securely interconnects the sliding panels 4 and 5 in the closed position, and securely retains or locks the same therein, but also forms a watertight and weatherproof seal between the interior edges of the closures 4 and 5 to keep rain, exhaust, and other elements out of the vehicle cap.

The sliding panels 4 and 5 are preferably opened by inserting at least two fingers between a pair of adjacent flanges 56 or 57 and applying force thereto in opposite directions. It has been found quite convenient for right-hand users to place their thumb on the right-hand flange at a midpoint along the length of the flange, and their index and middle fingers on the left-hand flange, and apply oppositely directed forces to the flanges by simply twisting their hand with a swift wrist flicking action in a clockwise direction, thereby easily opening the sliding closures with a type of cam action. Since the flanges 56 and 57 are disposed on both the interior and exterior sides of the closure construction 1, this procedure may be used to open the sliding closures from either side of the vehicle cap 15.

To retain the sliding closures 4 and 5 in the fully open position, as shown in FIG. 3, the user simply diverges the closures until such time as the exterior side edges 60 thereof abut the latch members 73 on each side edge of the frame 2. In a manner similar to that previously described, the user then simply snaps the male and female latch members together with an outwardly directed force on each of the closures. This interconnection retains the sliding closures 4 and 5 in the fully open position, and further alleviates vibration of the sliding closures in the frame, thereby attenuating the accompanying annoying rattling sound. To close the sliding panels from the fully open position, the user may grasp the flange on that side of the window from which the user approaches, and apply an inwardly directed force thereto so as to disengage the snap lock. However, the closures 4 and 5 are preferably unlocked by using the previously described cam action release. With this procedure, to open the right-hand closure 5, a right-handed user places his thumb on the adjacent side frame 98 (FIG. 1) of fixed closure 40, and his index and middle fingers on the flange 57. The user then applies oppositely directed forces to the frame 98 and flange 57 by a flick of the wrist, using a twisting or rotative action in the nature of a cam. The left-hand closure 4 may then be unlocked from connection with its associated latch 73 in a similar fashion.

In the foregoing description, it will be readily appreciated by those skilled in the art, that many modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A slideable closure construction comprising:
a frame having a slide track therein;
first and second closures slideably mounted in said track and including interior end edges which abut in a closed position and are spaced apart in an open position;
a male latch member connected with one of said closure end edges and extending along the length thereof;
a female latch member connected with the other of said closure end edges and extending along the length thereof; said female latch member being shaped to selectively receive said male latch member therein and form a snap lock which securely interconnects said first and second closures in the closed position and simultaneously forms a weatherproof seal therebetween;
said male latch member comprising a bead having a plug portion with a bulbous transverse cross-sectional shape;
said female latch member comprising a channel including a pair of flanges spaced apart a distance adapted to receive said plug portion therebetween in an interference fit;
said female latch member including a base portion mounted in a first rigid frame with said flanges protruding therefrom; and
said female latch base portion being loosely mounted in said first frame in a manner which permits said female latch member to float in said first frame for smooth and reliable engagement with said male latch member.

2. A closure construction as set forth in claim 1, wherein:
said male latch member includes a base portion mounted in a second rigid frame with said plug portion protruding therefrom; and
said male latch base portion is loosely mounted in said second frame in a manner which permits said male latch member to float in said second frame for smooth and reliable engagement with said female latch member.

3. A slideable closure construction comprising:
a frame having a slide track therein;
first and second closures slideably mounted in said track and including interior end edges which abut in a closed position and are spaced apart in an open position;
a male latch member connected with one of said closure end edges and extending along the length thereof;
a female latch member connected with the other of said closure end edges and extending along the length thereof; said female latch member being shaped to selectively receive said male latch member therein and form a snap lock which securely interconnects said first and second closures in the closed position and simultaneously forms a weatherproof seal therebetween;
said male and female latch members respectively constituting a first male latch member and a first female latch member;
said first and second closures each including an exterior end edge which is disposed adjacent to an associated end of said frame when said closures are in a fully open position; and including
a second male latch member connected with one of each of said closure exterior end edges and said frame ends; and
a second female latch member connected with the other of each of said closure exterior end edges and said frame ends; said second female latch member being shaped to selectively receive said second male latch member therein and form a second snap lock when securely retains each of said closures in the fully open position;
said first and second closures each include a flange projecting from one side thereof at a position disposed adjacent to an associated one of the interior end edges; each flange being located inwardly from the associated end edge a distance sufficient to permit a user to insert at least two fingers therebetween in the closed position, whereby force applied by the fingers of the user in opposite directions easily disengages the snap lock, and permits said closures to be translated into the open position.

4. A closure construction as set forth in claim 3, wherein:
each male latch member comprises a bead including a plug portion having a bulbous transverse cross-sectional shape; and
each female latch member comprises a channel including a pair of flanges spaced apart a distance adapted to receive said plug portion therebetween with an interference fit.

5. A closure construction as set forth in claim 4, wherein:
said first female latch member includes a base portion mounted in a first rigid frame having said flanges protruding therefrom; and
said female latch base portion is loosely mounted in said first frame in a manner which permits said female latch member to float in said first frame for smooth and reliable engagement with said first male latch member;
said first male latch member includes a base portion mounted in a second rigid frame having said plug portion protruding therefrom; and
said male latch base portion is loosely mounted in said second frame in a manner which permits said male latch member to float in said second frame for smooth and reliable engagement with said first female latch member.

6. A slidable closure construction comprising:
a frame having a slide track therein;
first and second closures slideably mounted in said track and including interior end edges which converge in a closed position and diverge in an open position, and exterior end edges which are disposed adjacent to an associated end of said frame when said closures are in a fully open position;
a male latch member connected with one of each of said closure exterior edges and said frame ends;
a female latch member connected with the other of each of said closure exterior end and said frame ends; said female latch member being shaped to selectively receive said male latch member therein and form a snap lock therebetween which connects said first and second closures with said associated frame ends and retains said closures in the fully open position.

7. A closure construction as set forth in claim 6, wherein:
said male latch member comprises a bead having a plug portion with a bulbous transverse cross-sectional shape; and
said female latch member comprises a channel having a pair of flanges spaced apart a distance adapted to receive said plug portion therebetween in an interference fit.

8. A closure construction as set forth in claim 7, wherein:
said male and female latch members are each sized in a manner whereby said male plug portion is snugly and frictionally engaged by said female flanges to alleviate vibration of said closures in said frame.

9. A slideable closure construction comprising:
a frame having a slide track therein, and first and second end segments;
at least one closure slideably mounted in said track and including an interior end edge which converges with said frame first end segment in a closed position and diverges from said frame first end segment in an open position; said closure further including an exterior end edge disposed adjacent to said frame second end segment when said closure is in a fully open position;
a male latch member connected with one of said closure exterior end edge and said frame second end segment;
a female latch member connected with the other of said closure exterior end and said frame second end segment; said
female latch member being shaped to selectively receive said male latch member therein and form a snap lock therebetween which connects said closure with said frame second end segment and retains said closure in the fully open position.

10. A closure construction as set forth in claim 9, wherein:
said male latch member comprises a bead having a plug portion with a bulbous transverse cross-sectional shape; and
said female latch member comprises a channel having a pair of flanges spaced apart a distance adapted to receive said plug portion therebetween in an interference fit.

11. A closure construction as set forth in claim 10, wherein:
said male and female latch members are each sized in a manner whereby said male plug portion is snugly and frictionally engaged by said female flanges to alleviate vibration of said closure in said frame.

12. A slideable closure construction comprising:
a frame having a slide track therein;
first and second closures slideably mounted in said track and including interior end edges which abut in a closed position and are spaced apart in an open position; said first and second closures each including an exterior end edge which is disposed adjacent to an associated end of said frame when said closures are in a fully open position;
a male latch member connected with one of said interior end edges and extending along the length thereof;
a female latch member connected with the other of said interior end edges and extending along the length thereof; said female latch member being shaped to selectively receive said male latch member therein and form a snap lock which securely interconnects said first and second closures in the closed position and simultaneously forms a weather-proof seal therebetween;
a second male latch member connected with one of each of said closure exterior end edges and said frame ends; and
a second female latch member connected with the other of each of said closure exterior end edges and said frame ends; said second female latch member being shaped to selectively receive said second male latch member therein and form a second snap lock which securely retains each of said closures in the fully open position.

13. A slideable closure construction comprising:
a frame having a slide track therein;
first and second closures slideably mounted in said track and including interior end edges which abut in a closed position and are spaced apart in an open position;
a male latch member connected with one of said interior end edges and extending along the length thereof; said male latch member comprising a bead having a plug portion with a bulbous transverse cross-sectional shape;
a female latch member connected with the other of said interior end edges and extending along the length thereof; said female latch member comprising a channel including a pair of flanges spaced apart a distance adapted to receive said plug portion therebetween in an interference fit which securely interconnects said first and second closures in the closed position and simultaneously forms a weatherproof seal therebetween; and wherein
one of said female and male latch members includes a base portion mounted in a first rigid frame; said latch base portion being loosely mounted in said first frame in a manner which permits said one latch member to float in said first frame for smooth and reliable engagement with the other latch member.

* * * * *

UNITED STATES PATENT AND TRADEMARK OFFICE
CERTIFICATE OF CORRECTION

PATENT NO. : 4,322,914
DATED : April 6, 1982
INVENTOR(S) : Donald C. McGaughey

It is certified that error appears in the above—identified patent and that said Letters Patent is hereby corrected as shown below:

Column 8, line 13 (Claim 3):

"when" should be --which--.

Signed and Sealed this

Fourteenth Day of September 1982

[SEAL]

Attest:

Attesting Officer

GERALD J. MOSSINGHOFF

Commissioner of Patents and Trademarks